United States Patent [19]

Peterson et al.

[11] Patent Number: 4,546,293
[45] Date of Patent: Oct. 8, 1985

[54] MOTOR CONTROL FOR A BRUSHLESS DC MOTOR

[75] Inventors: William J. Peterson; Dennis T. Faulkner, both of Rockford, Ill.

[73] Assignee: Sundstrand Corporation, Rockford, Ill.

[21] Appl. No.: 411,075

[22] Filed: Aug. 24, 1982

[51] Int. Cl.[4] .................. H02K 23/00; H02P 1/18
[52] U.S. Cl. ........................... 318/254; 318/138; 318/341; 318/439
[58] Field of Search ............. 318/138, 254 A, 254, 318/439, 811, 810, 721–724, 341

[56] References Cited

U.S. PATENT DOCUMENTS

| | | | |
|---|---|---|---|
| 3,908,130 | 9/1975 | Lafuze | 318/254 A X |
| 4,048,554 | 9/1977 | Stich | 363/138 X |
| 4,249,116 | 2/1981 | Hieda | 318/254 |
| 4,295,085 | 10/1981 | Lafuze | 318/721 |
| 4,338,558 | 7/1982 | Okamatsu | 318/811 X |

Primary Examiner—William M. Shoop
Assistant Examiner—Patrick C. Keane
Attorney, Agent, or Firm—Harold A. Williamson; Ted E. Killingsworth; James A. Wanner

[57] ABSTRACT

This invention relates to a motor control system for a brushless DC motor having an inverter responsively coupled to the motor control system and in power transmitting relationship to the motor. The motor control system includes a motor rotor speed detecting unit that provides a pulsed waveform signal proportional to rotor speed. This pulsed waveform signal is delivered to the inverter to thereby cause an inverter fundamental current waveform output to the motor to be switched at a rate proportional to said rotor speed. In addition, the fundamental current waveform is also pulse width modulated at a rate proportional to the rotor speed.

A fundamental current waveform phase advance circuit is controllingly coupled to the inverter. The phase advance circuit is coupled to receive the pulsed waveform signal from the motor rotor speed detecting unit and phase advance the pulsed waveform signal as a predetermined function of motor speed to thereby cause the fundamental current waveform to be advanced and thereby compensate for fundamental current waveform lag due to motor winding reactance which allows the motor to operate at higher speeds than the motor is rated while providing optimal torque and therefore increased efficiency.

3 Claims, 9 Drawing Figures

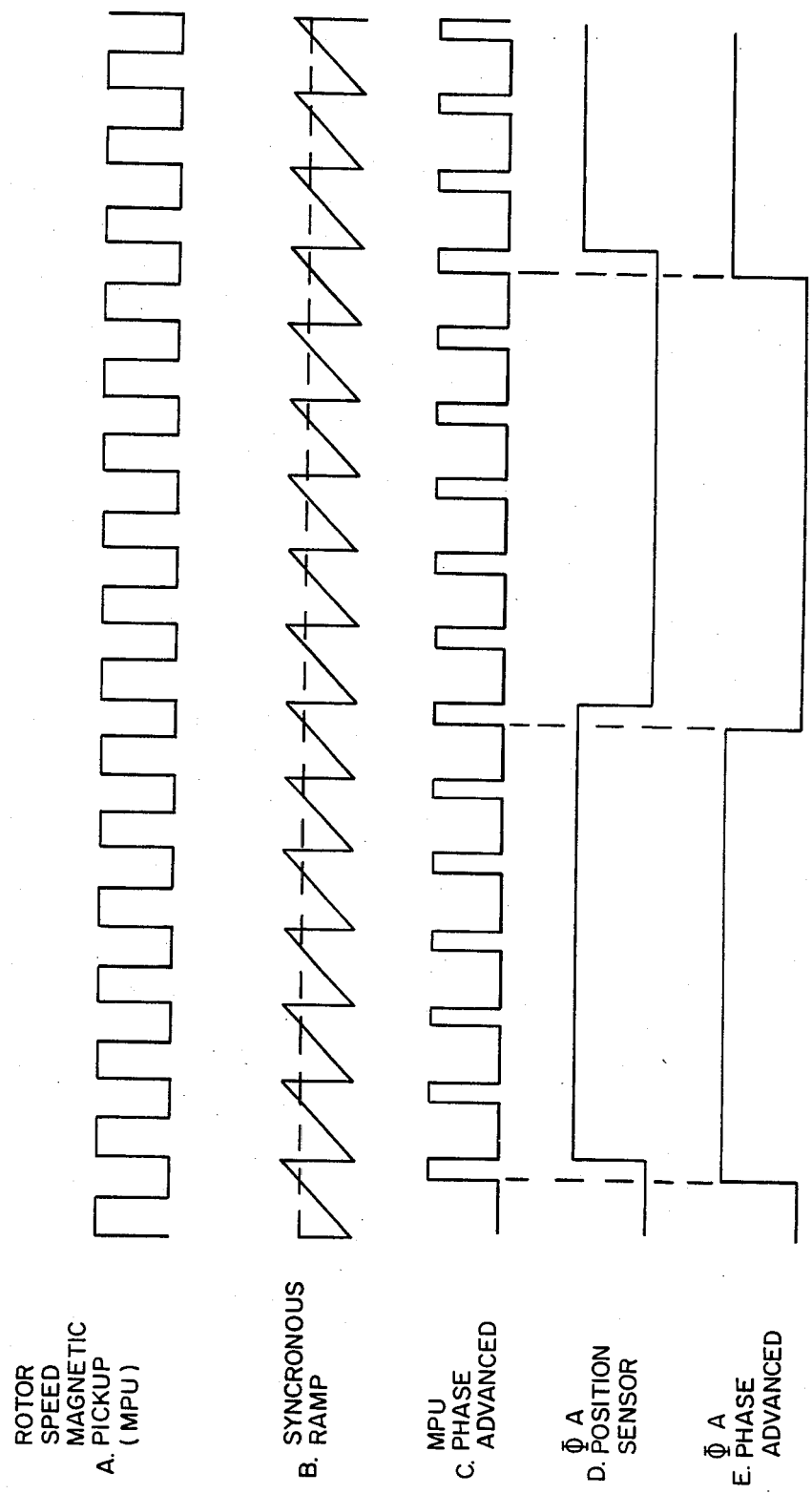

MOTOR CONTROL FOR A BRUSHLESS DC MOTOR

ORIGIN OF THE INVENTION

The invention described herein was made in the performance of work under a NASA contract and subject to the provisions of Section 305 of the National Aeronautics and Space Act of 1958, Public Law 85-568 (72 Stat. 435; 42 USC 2457).

TECHNICAL FIELD

This invention relates to a motor control system for a samarium cobalt brushless DC motor.

BACKGROUND ART

Lightweight, highly efficient variable speed DC motors have been long sought after. The use of pulse width modulated inverters in conjunction with brushless DC motors have yielded improved performance characteristics. Typical of such approaches is that put forward by Saul L. Malkeil in his U.S. Pat. No. 3,783,359 which is directed to a brushless DC motor and has in combination therewith three Hall generators disposed 120 electrical degrees apart. The Hall generators are essentially position sensors which provide outputs to switch a DC power supply to the motor. The Malkeil patent does not provide as does the invention to be described, a motor control system that switches a DC current at a rate proportional to rotor speed and simultaneously pulse width modulates the switched DC current at a rate proportional to rotor speed while causing the resulting switched current to be phase advanced as a function of speed.

DISCLOSURE OF THE INVENTION

This invention relates to a motor control system for a brushless DC motor having an inverter responsively coupled to the motor control system and in power transmitting relationship to the motor. The motor control system includes a motor rotor speed detecting unit that provides a pulsed waveform signal proportional to rotor speed. This pulsed waveform signal is delivered to the inverter to thereby cause an inverter fundamental current waveform output to the motor to be switched at a rate proportional to the rotor speed. In addition, the fundamental current waveform is also pulse width modulated at a rate proportional to the rotor speed.

A fundamental current waveform phase advance circuit is controllingly coupled to the inverter. The phase advance circuit is coupled to receive the pulsed waveform signal from the motor rotor speed detecting unit and phase advance the pulsed waveform signal as a predetermined function of motor speed to thereby cause the fundamental current waveform to be advanced and thereby compensate for fundamental current waveform lag due to motor winding reactance which allows the motor to operate at higher speeds than the motor is rated while providing optimal torque and therefore increased efficiency.

It is therefore a primary object of the invention to provide a phase advanced pulse width modulated current signal to a brushless DC motor to thereby allow the motor to be run at speeds higher than that that could be obtained without phase advance.

Another object of the invention is to provide a brushless DC motor with a phase advanced signal responsive to actual speed whereby the phase advance compensates for current waveform lag due to motor winding reactance by realigning the motor current waveform with the back EMF waveform which results in the motor operating at an optimal torque and increased efficiency.

Yet another object of the invention is to provide a motor control system for a brushless DC motor wherein a fundamental current waveform is advanced in respect of the back EMF waveform which thereby enables the motor to operate at speeds higher than could be achieved without phase advance. The phase advance thereby allowing a smaller, lighter weight motor to be designed for a given speed than heretofore has been possible.

In the attainment of the foregoing objects, the invention contemplates a motor control system for a brushless DC motor having a rotor wherein a DC source of power is mutually coupled to a PWM inverter and to the motor control system. The motor control system is controllingly coupled to the PWM inverter.

The PWM inverter has a fundamental current waveform output signal delivered to the motor. The phase of the fundamental current waveform is controlled by the motor control system. The motor control system is responsive to a speed command input and is responsively coupled to a motor rotor position sensing unit that provides a rotor position waveform signal through the motor control system to the inverter whereby the sensed rotor position waveform signal causes the inverter to provide a fundamental switched current waveform. The fundamental switched current waveform is pulse width modulated at a rate to thereby control output voltage to the motor.

The motor control system is additionally responsively coupled to a rotor speed detecting unit. The improvement in said motor control system consists of the provision of a fixed oscillating circuit that is controllingly coupled to the PWM inverter and to the rotor speed detecting unit to thereby pulse width modulate the fundamental switched current waveform at a fixed rate when the motor is operating below a predetermined speed.

A circuit is coupled to the rotor speed detecting unit and to the inverter to cause, whenever the motor speed exceeds the predetermined speed, the inverter fundamental current waveform output to be switched at a rate proportional to the rotor speed and to be pulse width modulated at a rate proportional to rotor speed.

A fundamental current waveform phase advance circuit is controllingly coupled to the inverter. The phase advance circuit is coupled to receive the pulsed waveform signal from the rotor speed detecting unit and phase advance the pulsed waveform signal a predetermined amount as a function of motor speed above the predetermined speed to thereby cause the fundamental current waveform to be phase advanced and to lead the motors back EMF waveform.

Other objects and advantages of the present invention will be apparent upon reference to the accompanying description when taken in conjunction with the following drawings:

BRIEF DESCRIPTION OF THE DRAWINGS

FIGS. 5a–e is a waveform timing chart representing the relationship of the more significant waveforms involved in the generation of the phase advance of the invention.

Figure 1:
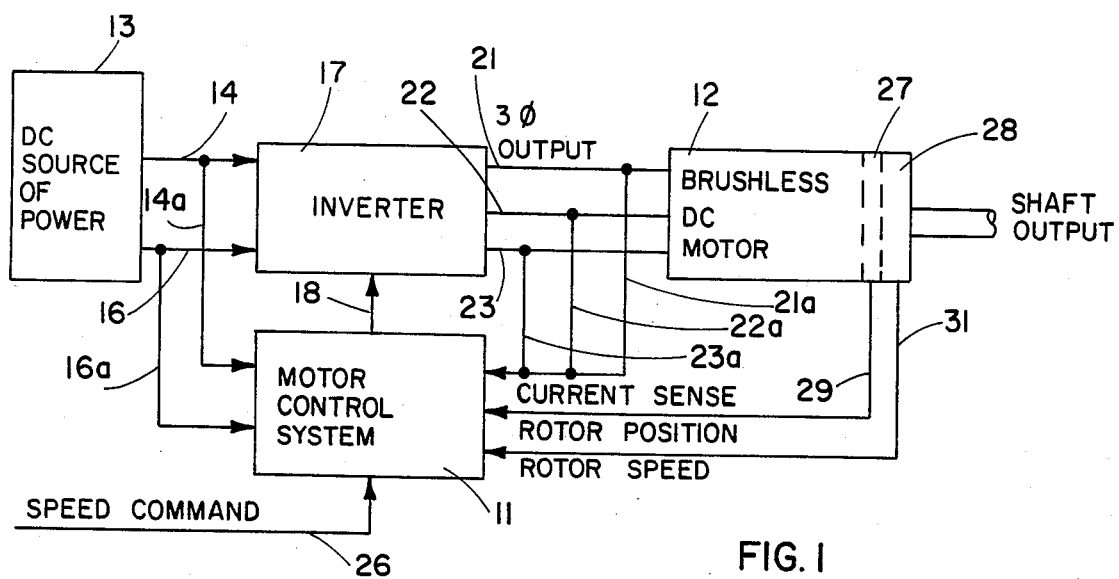
FIG. 1 is a generalized block diagram of a motor, inverter and motor control system in which the invention finds utility.
Figure 2:
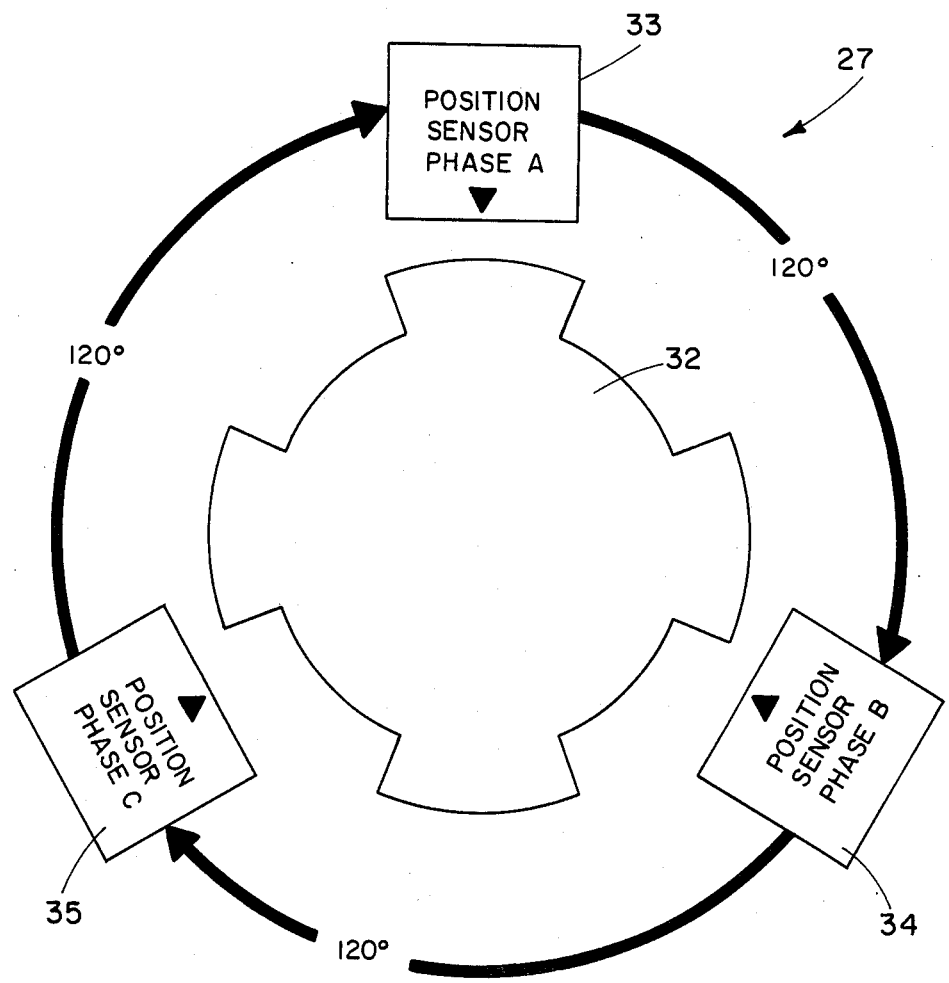
FIG. 2 is a diagrammatic illustration of rotor position sensors.

Reference is now made to FIG. 1 which illustrates in block diagram form the overall system which includes a DC source of power 13 which is in practice a battery. The DC source of power 13 is coupled mutually to an inverter 17 by electrical leads 14 and 16, and to the motor control system 11 of the invention by leads 14, 14a, 16 and 16a. The inverter 17 has a three phase output which appears on leads 21, 22 and 23, and is delivered to a brushless DC motor 12. The motor may be of the permanent magnet samarium cobalt type. The motor 12 is equipped with a motor rotor position sensing unit 27 and a magnetic pickup sensing unit 28. The motor three position sensors 27 are shown in FIG. 2 as indicated by reference numerals 33, 34 and 35, and are positioned electrically 120° apart around the rotor 32. The DC source of power 13 provides power not only to the inverter 17, but to the logic of the motor control system 11. A speed command 26 is shown as an input to the motor control system 11. Although not shown in FIG. 1, the speed command 26 is compared in the motor control system 11 to a speed feedback signal delivered via lead 31 to thereby control the duty cycle of the pulse width modulated inverter 17 output which appears on leads 21, 22 and 23. The position sensors of FIG. 2 indicated as position sensing means 27 in FIG. 1 are used to determine the switch pattern of the inverter output stages as will be shown and described hereinafter in FIG. 3. The motor control system 11 is also shown coupled to the inverter 17 output on leads 21, 22 and 23 by leads 21a, 22a and 23a, which connection provides a current sensed input to the motor control system 11. As was noted earlier, the DC source of power 13 is connected across the inverter 17 by leads 14 and 16. The inverter 17 is conventional in design and has 3 legs which are made up of six switches which are not shown. The six switches are individually connected to the motor control system 11 and are made to switch the three motor phases to either terminal of the DC source of power in the form of battery voltage in response to the rotor position, the motor speed, the speed command 26 and the motor current information that the motor control system 11 has received.

Figure 3:
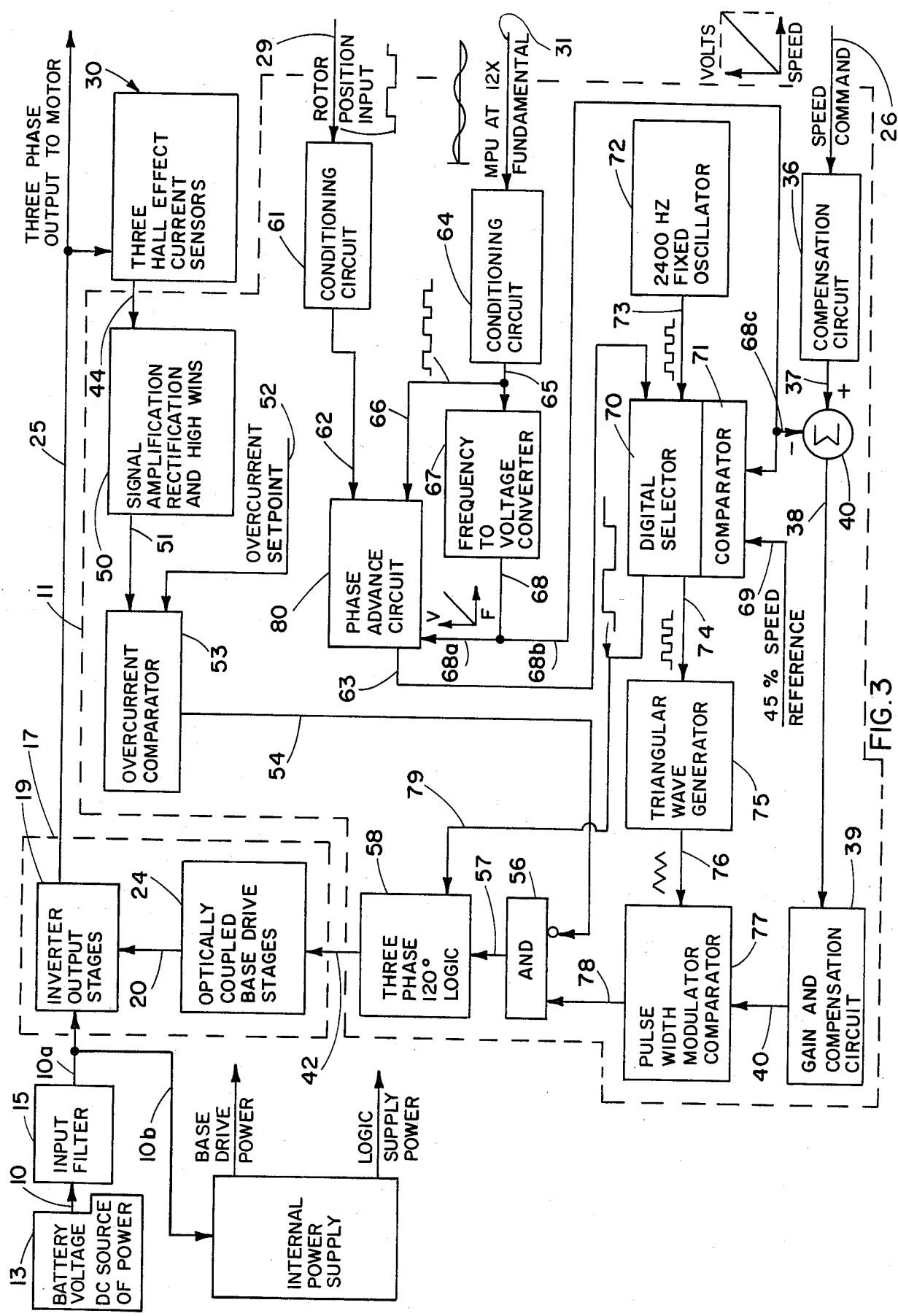
FIG. 3 is a block diagram of the motor control system embodying the invention and its cooperative relationship with the inverter.

Reference is now made to FIG. 3, a study of which will reveal that the inverter 17 and motor control system 11 of FIG. 1, both shown in dotted outline, provides a basic control system which uses rotor position to determine the switching of the inverter 17. Duty cycle is varied proportionally to the difference between the actual speed presented on lead 31 which has been sensed by the magnetic pickup unit 28 (MPU) and speed command as shown delivered on lead 26. In a manner to be described more fully hereinafter, the PWM output is synchronized to the MPU input, above 45% of speed, whereas below 45% of that speed, the PWM runs off of a free running 2400 HZ clock signal from fixed oscillator circuit 72. The motor current is sensed by three hall effect current sensors 30, as shown, and delivered via lead 44 through signal amplification/rectification and high wins circuit 50, and thence via lead 51 to over current comparator 53 and compared with an over current set point or level delivered via lead 52. Whenever this level is exceeded, the comparator 53 shuts off the PWM signal via the AND gate 56 via lead 54 until the current drops below a lower hysteresis level. This allows for maximum torque while protecting the inverter transistors. A principal feature of the invention shown in the block diagram formed in FIG. 3 is a phase advance provided by phase advance circuit 80 to be described more fully in respect to FIG. 4. The phase advance is required to obtain high speed at high torque operation. The desire is to pump current into the motor stator (not shown) ahead of the static rotor position. This requirement is due to several factors which include the delay caused by stator inductance, the need to overcome high back EMF's at higher speed, and what seems to be a shift in the magnetic field. The phase advance circuit 80 which is more fully shown in FIG. 4 and will be described in detail hereinafter, functions by shifting the rotor position signals on lead 29 and MPU signal on lead 31, an amount which is a function of the speed of operation.

FIG. 3 shows the input filter 15 connected via lead 10 to the DC source of power 13. The filter 15 is used to maintain input voltage during switching and absorbs spikes during turn-off. The internal power supply block 41 has a shut down circuit input not shown, which shuts off all basic drive power and logic power at the same time a signal shuts off the bottom transistors not shown, of the inverter 17. The inverter output stages 19 of the inverter 17 of FIG. 1 are shown here in block diagram form. Each top transistor of the inverter is driven by an isolated supply and is connected via lead 20 thru an optical isolator in the form of the block 24 designated optically coupled base drive stages. Block 24 is coupled via lead 42 to three phase 120° logic control 58. Each bottom transistor (not shown) of the inverter 17 is directly connected to its control logic and all the drive stages having a common power supply.

In respect to the current limit and current sensing described earlier, these additional thoughts are offered. The three phase currents going to the motor 12 are sensed with three Hall effect current sensors 30. Each sensor 30 is made up of a linear Hall effect sensor placed in the gap of a metal toroid and produces a signal proportional to the current that goes through the center of the toroid. The conditioning of this signal requires amplification of the signals from the Hall effect sensors and inversion of negative polarity signals to allow protection regardless of current direction. The outputs of the conditioning circuit can then be fed into the high wins circuits included in block 50 to pick off the maximum current on any transistor. This signal which appears on lead 51 is compared to a predetermined current level on lead 52 to generate the aforementioned current limit signal on lead 54.

In practice, though not shown in the drawings, a time delay of about 4 micro seconds is ORed with the current limit signal to maintain a minimum off-time of a transistor resulting from a current limit condition. The set point of the current limit has been selected by determining a maximum safe peak current for the transistors and then approximating a current set point allowing for response time for the sensors and the rise time of the current.

The phase advance circuit 80 is provided with three inputs. The first input being designated the rotor position inputs or lead 29. In the description that next follows, reference will be made, from time to time, to FIG. 5 and the various waveforms shown therein. Where appropriate for the understanding of the operation of the circuits being described, reference will be made to FIG. 5 by indicating the waveform line designations A, B, C, D and E. Accordingly, one of the three rotor position input signal on lead 29 is that shown by line D, FIG. 5. This signal is passed through a conditioning circuit 61 and delivered via lead 62 to the phase advance circuit 80. An MPU signal on lead 31 from rotor speed MPU 28 of FIG. 1 is shown as having a sinosoidal waveform. This MPU signal passes through the conditioning circuit 64 and appears on leads 65 to a frequency to voltage converter 67 and lead 66 to the phase advance circuit 80. The waveform of the signal on leads 65 and 66 is represented by line A, FIG. 5. The output of the frequency to voltage converter 67 that appears on leads 68, 68a to phase advance circuit 80, and on leads 68, 68b, 68c to a summer 40 and comparator 71 follow the functional relationship indicated by the graph shown adjacent lead 68.

The speed command which is present on lead 26 is delivered to the summer 40 via compensation circuit 36 and lead 37. The summer 40 delivers an error signal on lead 38 that controls the duty cycle of pulse width modulation.

A 2400 HZ fixed oscillator circuit 72 is coupled via the lead 73 to the digital selector circuit 70. The waveform on lead 73 is illustrated just above the lead 73 and between the oscillator 72 and the digital selector circuit 70. The phase advance circuit 80 has an output on lead 63 to the digital selector circuit 70. The digital selector circuit 70 has a pair of outputs on leads 74 and 79 which respectively couple the digital selector circuit 70 to the triangular waveform generator 75 and the three phase 120° logic circuit 58. The signal on lead 74 has a waveform configuration identical to that which appears on lead 73, while depending upon the mode of operation, as when motor speed is above 45% of rated speed, the signals on lead 79 have the waveform of line E, FIG. 5. The triangular waveform generator 75 delivers on lead 76 the triangular waveform indicated, to a pulse width modulated comparator circuit 77, which is also coupled to the summer 40 to receive the error signal on lead 38 via the gain and compensation circuit 39 and lead 43. The pulse width modulated comparator circuit 77 has an output 78 delivered to the AND gate 56. The AND gate 56 has an output to the three phase 120° logic delivered by lead 57.

Figure 4:
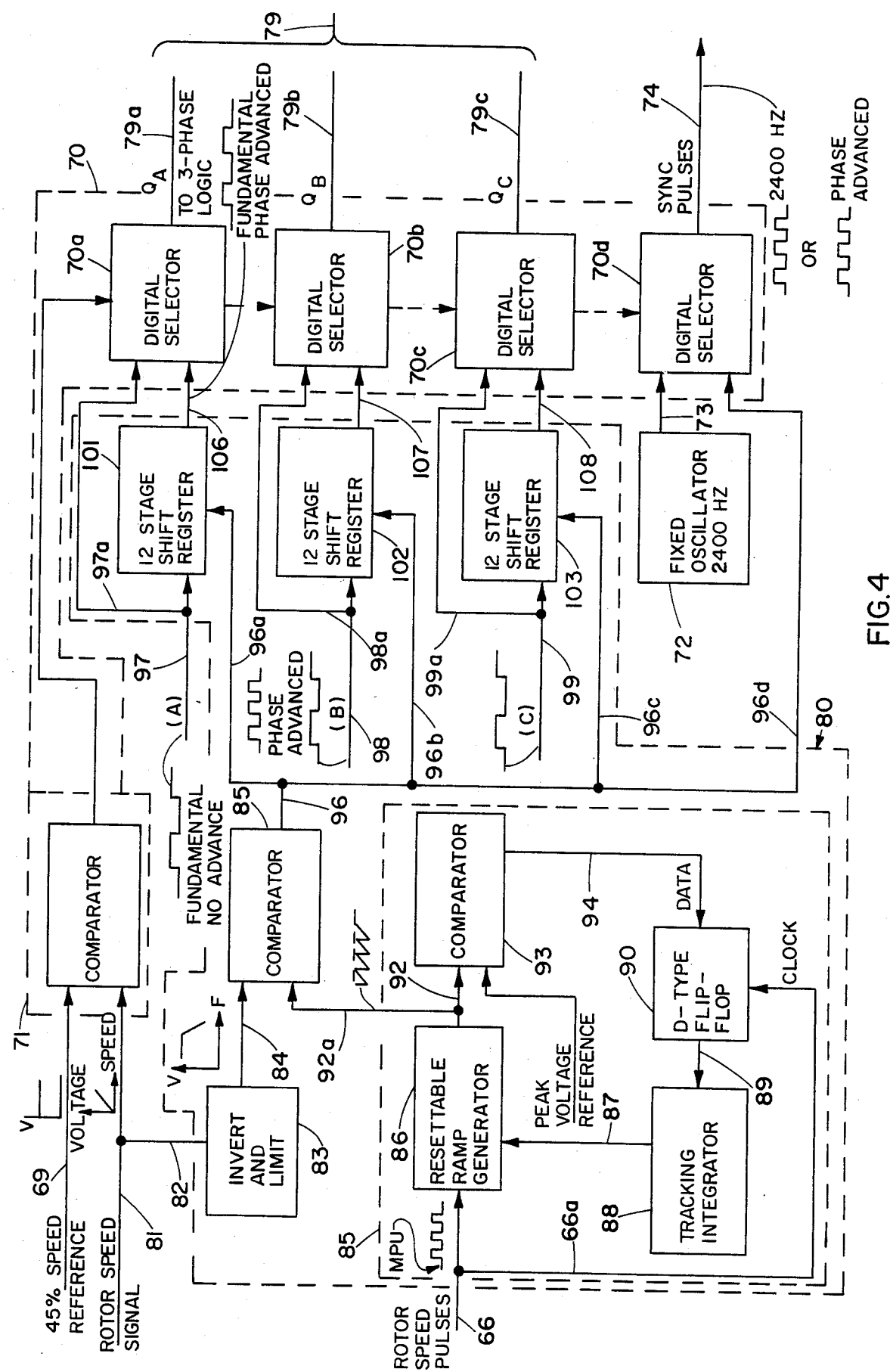
FIG. 4 is a block diagram of the phase advance circuit arrangement that contains the invention.

Reference is now made to FIG. 4 which presents in expanded detail in block diagram form the phase advance circuit 80 of FIG. 3. In order for the reader to more readily appreciate the relationship of the phase advance circuit 80, and the other components shown in FIG. 4, it is pointed out that the digital selectors 70 and the comparator 71 of FIG. 3 are shown in FIG. 4, in dotted outline. It will be appreciated that the digital selector 70 of FIG. 3 includes individual digital selectors 70a, 70b, 70c and 70d. The digital selectors 70a, 70b and 70c have outputs 79a, 79b and 79c, which outputs find their full equivalent in the single lead line 79 of FIG. 3. The 2400 HZ fixed oscillator circuit 72 and its output 73 are illustrated in the same fashion in both FIGS. 3 and 4. The electrical leads 97a, 106; 98a, 107; 99a, 108; 96d are represented in FIG. 3 by the single electrical lead 63. As have been indicated earlier, FIG. 5 shows the waveforms used or created by the phase advance system of the invention. The phase advance is implemented by generating a constant amplitude ramp; see line B, FIG. 5, which is synchronous to the rotor speed pulses, i.e., the conditioned MPU pulse waveform of line A, FIG. 5. The ramp waveform signal of line B, FIG. 5 is generated by ramp generator 85 shown in dotted outline in FIG. 4. The ramp generator 85 includes a resetable ramp generator 86 which has delivered thereto rotor speed pulses on lead 66. The ramp speed pulses on line 66 also provide a clock function and are delivered via leads 66, 66a to the D-type flip flop 90. The resetable ramp generator 86 is drivingly coupled by a tracking integrator circuit 88 via lead 87 and has its output on lead 92 to the comparator 93, which comparator 93 is coupled via lead 94 to the D-type flip flop 90. The constant amplitude ramp waveform of line B, FIG. 5 has to have a variable slope to maintain constant amplitude over a range of rotor speeds. This is done with the resetable ramp generator 86 with the ramp reset to zero with each pulse. If the peak voltage of the ramp exceeds the reference at the time of the next sync pulse, the tracking integrator 88 will integrate this error signal over the next period and result in decreasing the slope. The opposite is true if the ramp does not reach its peak reference voltage. To get the signals advanced, we actually delay the MPU pulses using the ramp as a proportional timer. That is, at peak value of ramp, MPU is delayed one pulse and at zero value, delay is zero. These points correspond to zero and 30° of advance respectively. The amount of advance is selected by the comparator 85 and controlled by the rotor speed signal on lead 81. The output of the comparator 85 on lead 96 is the signal phase advanced by an amount determined by the rotor speed, which can be seen on line C of FIG. 5. To get position advance, the three position signals on lines 97, 98 and 99 are delayed 12 pulses of the advanced MPU signal by the 12 stage shift registers 101, 102 and 103. This results in a delay of 330° to 360° or stated otherwise, 360° minus the advance of the MPU signal which corresponds to an advance of the position signal, the same amount as the MPU. Digital selectors 70a, 70b, and 70c are used to switch between the phase advanced signal and the direct fundamental input signal. The switch over is done at the 45% speed point using a comparator.

Although this invention has been illustrated and described in connection with the particular embodiments illustrated, it will be apparent to those skilled in the art that various changes may be made therein without departing from the spirit of the invention as set forth in the appended claims.

We claim:

1. A motor control means for a brushless DC motor having a rotor wherein a DC source of power is mutually coupled to a PWM inverter and to said motor control means, said motor control means controllingly coupled to said PWM inverter, said PWM inverter having a fundamental current waveform output signal delivered to said motor, the phase of said fundamental current waveform controlled by said motor control means, said motor control means responsive to a speed command input and responsively coupled to a motor rotor position pulsed sensing means that provides a rotor position waveform signal through said motor control means to said inverter whereby said sensed rotor position waveform signal causes said inverter to provide a fundamental switched current waveform, said fundamental switched current waveform being pulse width modulated at a rate to thereby control output voltage, said motor control means being additionally responsively coupled to a rotor speed detecting means, the improvement in said motor control means comprising, fixed oscillating means controllingly coupled to said PWM inverter and to said rotor speed detecting means to thereby pulse width modulate said fundamental switched current waveform at a fixed rate when said motor is operating below a predetermined speed, means coupled to said rotor speed detecting means and to said inverter to cause, whenever said motor speed exceeds said predetermined speed, said inverter fundamental current waveform output to be switched at a rate proportional to said rotor speed and to be pulse width modulated at a rate proportional to rotor speed, and fundamental current waveform phase advance means controllingly coupled to said inverter, said phase advance means coupled to receive said pulsed waveform signal from said rotor speed detecting means and phase advance said pulsed waveform signal a predetermined amount as a function of rotor speed above said predetermined speed to thereby cause said fundamental current waveform to be phase advanced and to lead the motors back EMF waveform.

2. A motor control means for a brushless DC motor having a PWM inverter responsively coupled to said motor control means and in power transmitting relationship to said motor, said motor control means including in combination, a motor rotor speed detecting means providing a pulsed waveform signal proportional to rotor speed to be delivered to said PWM inverter to thereby cause an inverter fundamental current waveform output to said motor to be switched at a rate proportional to said rotor speed and said fundamental current waveform to be pulse width modulated at a rate proportional to rotor speed, fundamental current waveform phase advance means controllingly coupled to said PWM inverter, said phase advance means coupled to receive said pulsed waveform signal from said rotor speed detecting means and phase advance said pulsed waveform signal a predetermined amount as a function of rotor speed to thereby cause said fundamental current waveform to be advanced and thereby compensate for fundamental current waveform lag due to motor winding reactance which allows said motor to operate at higher speed than said motor is rated while providing optimal torque and therefore increased efficiency.

3. The motor control of claim 1 or 2 wherein the motor is of the permanent magnet samarium cobalt type.

* * * * *